United States Patent [19]
Olsson

[11] Patent Number: 5,239,155
[45] Date of Patent: Aug. 24, 1993

[54] MULTIPURPOSE SPOT WELDING GUN WITH REPLACEABLE ELECTRODE HOLDERS

[76] Inventor: Goran Olsson, 1525 Eagle Glen, Escondido, Calif. 92029

[21] Appl. No.: 979,049

[22] Filed: Nov. 19, 1992

[51] Int. Cl.⁵ .................... B23K 11/11; B23K 11/28; B23K 11/31
[52] U.S. Cl. ............................ 219/86.25; 219/86.21; 219/86.8
[58] Field of Search ............... 219/86.25, 86.33, 86.21, 219/86.8, 89, 90

[56] References Cited

U.S. PATENT DOCUMENTS 4,924,055  5/1990  Nakahigasi et al. ............. 219/86.21

FOREIGN PATENT DOCUMENTS 2917955  11/1980  Fed. Rep. of Germany ... 219/86.21

Primary Examiner—Geoffrey S. Evans
Attorney, Agent, or Firm—Frank D. Gilliam

[57] ABSTRACT

An adaptable, multipurpose spot welding gun having replaceable electrode holders with different configurations. The spot welding gun includes a pneumatic cylinder with a first electrode secured to the cylinder piston. A rotatable housing is mounted on the gun adjacent to the moveable electrode. An electrode holder is mounted on the housing. The electrode holder may extend parallel to the cylinder, carrying a second electrode spaced from the first electrode. Alternatively, the electrode holder may be arc-shaped, extending away in a direction perpendicular to the cylinder, then back to hold a second electrode adjacent to the first electrode. This holder is fastened to the housing in a manner allowing it to swing to the side to allow the holder to fit over intervening structure, then swung back to the operating position. Either electrode can be easily installed or removed. Electrical connections from a welder power supply and a switch are provided so that when the electrodes are placed with metal to be welded between them and the pneumatic cylinder is actuated, the electrodes press against the opposite sides of the metal and electrical flow between the electrodes cause a spot weld to be made.

28 Claims, 2 Drawing Sheets

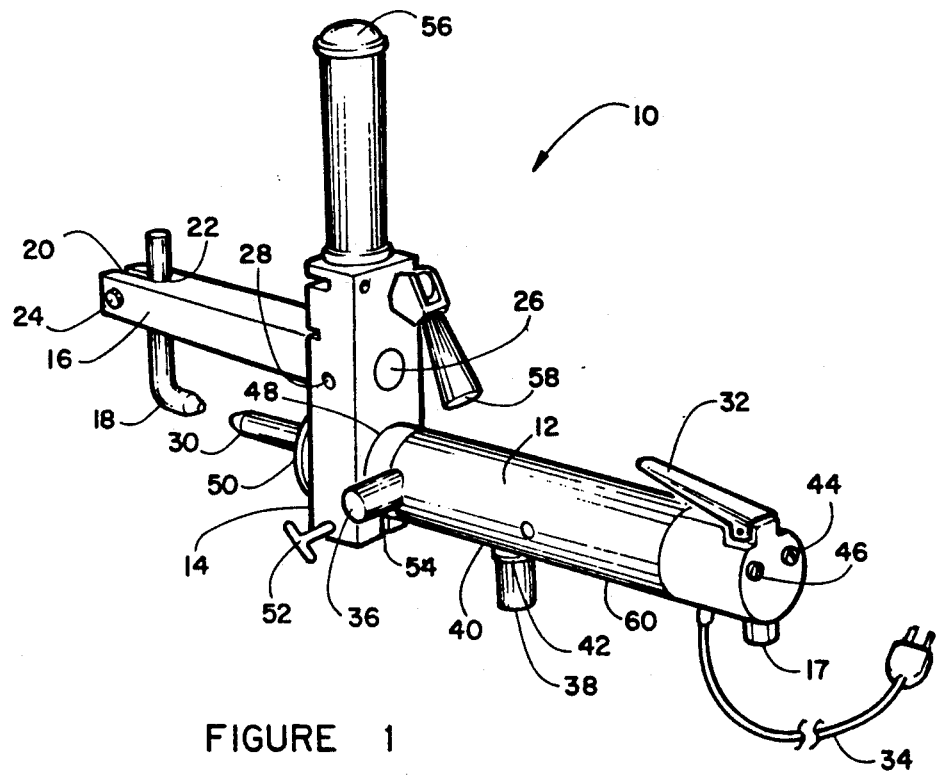
FIGURE 1
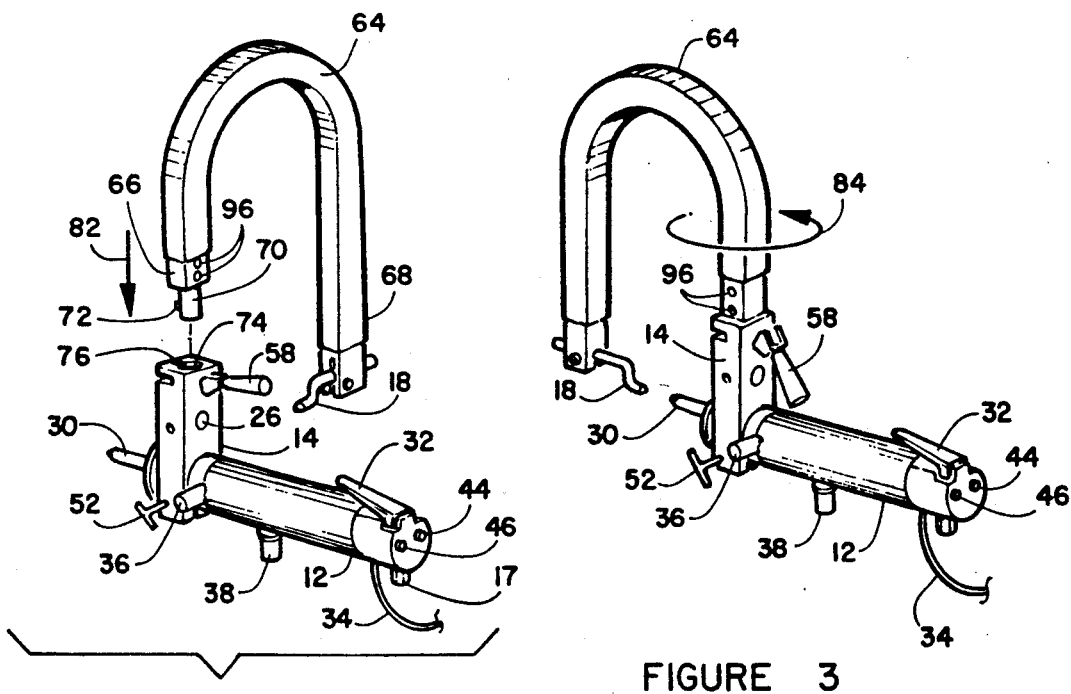
FIGURE 2
FIGURE 3

MULTIPURPOSE SPOT WELDING GUN WITH REPLACEABLE ELECTRODE HOLDERS

BACKGROUND OF THE INVENTION

This invention relates to spot welding guns and, more specifically, to a spot welding gun having replaceable, multipurpose, adaptable electrode holders.

Resistance or spot welding joins metal sheets or structures through heat produced by resistance to the flow of electrical current. The metal structures to be welded are clamped together with rod-shaped electrodes applying pressure on opposite sides. An electric current passed between the electrodes meets resistance when it flows across the metal structures, producing heat that melts the metal and welds them together. No filler metal or flux is used.

Conventional spot welders use a gun having two electrode holders, one fixed and the other moveable, extending from a handle, adapted to pinch together in the manner of pliers along a line approximately perpendicular to the handle axis. The pinching force may be applied manually or by a pneumatic cylinder, electrical solenoid or the like. The spot welding gun is connected to a welder power supply through heavy cables carrying the high amperage current necessary for welding and to a source of air or electricity for applying the pinching force.

A number of different welder and electrode configurations have been developed for special purpose welding. While effective for simply welding metal sheets together along an edge, or for a single specific arrangement of metal structures, these devices are not adaptable to the wide variety of applications necessary in repair work, in particular auto body repair work.

In a many cases, it is necessary to spot weld at locations well away from the metal edges. Often welds must be made in areas having large or thick structures between the edge of the structure and the area to be welded. It is difficult and expensive to construct or assemble a special spot welder for each of these difficult situations.

Thus, there is a continuing need for multipurpose, easily adaptable, spot welding guns having electrode holders with the capability of welding at a variety of locations.

SUMMARY OF THE INVENTION

The above-noted problems, and others, are overcome by the spot welding gun of this invention, which basically comprises a pneumatic cylinder adapted to be held in the operator's hand, a first welding electrode secured to the cylinder piston for movement therewith, a support housing rotatably mounted on the cylinder adjacent the electrode end, and an elongated holder for a second electrode detachably mounted on said housing for holding the second electrode in a operative relationship to the first electrode.

Connections are mounted on the cylinder for connecting cables from a welder power supply to the electrodes and for connecting a source of pressurized air to the pneumatic cylinder. Also, an electrical switch for tuning the power supply on and off and a valve control for turning the air supply on and off are provided on the handle portion of the exterior of the cylinder.

The electrode holder may be an elongated bar-like structure having an axial cylindrical extension fitting into a hole in the housing and having a means for holding an electrode at the other end with the holder extending along a line generally parallel to the cylinder.

Alternatively, the electrode holder may have an arc-like configuration extending to the side of the cylinder, having one end fastened to the end of a support housing, which may be a single housing or the combination of an adapter secured to a housing. The holder is fastened directly to the housing o to the adapter on a housing by a mechanism which allows the holder to swing to the side, then be returned to the operating position so that the arc portion can fit over obstructions adjacent to the welding site.

BRIEF DESCRIPTION OF THE DRAWING

Details of the invention, and of certain preferred embodiments thereof, will be further understood upon reference to the drawing, wherein:

FIG. 1 is a perspective view of a first embodiment of the spot welding gun of this invention;

FIG. 2 is a perspective view of a partially assembled second embodiment of the spot welding gun;

FIG. 3 is a perspective view of the fully assembled embodiment of FIG. 2;

DETAILED DESCRIPTION OF PREFERRED EMBODIMENTS

Figure 4:
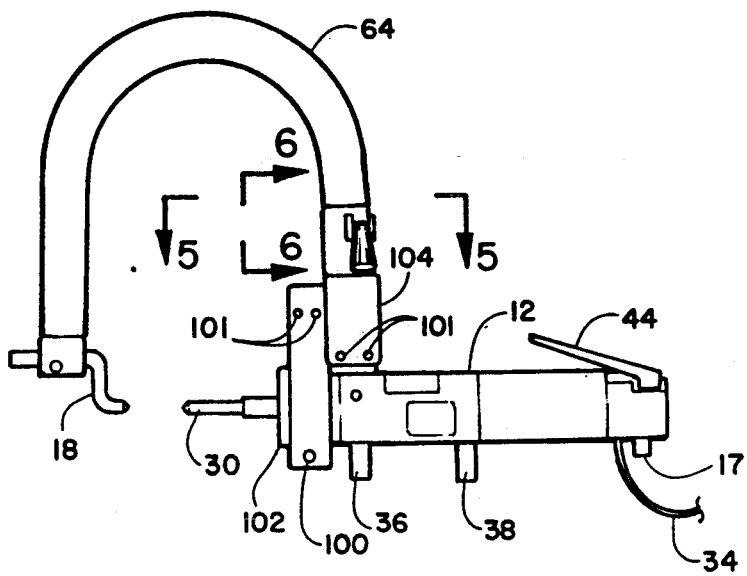
FIG. 4 is a side elevation view of a third embodiment of the spot welding gun.

Referring now to FIG. 1, there is seen a spot welding gun 10 basically including a pneumatic cylinder 12, a housing 14 and an electrode holder 16. Cylinder 12 is a conventional pneumatic cylinder, receiving pressurized air through a connection 17 from a conventional high pressure air source (not shown).

An electrode 18 is secured to a first end of elongated electrode holder 16 by any suitable means, such as a slot 20 from the end of the holder 16 to hole 22 in which electrode 18 is placed with a bolt 24 squeezing slot 20 and hole 22 to tightly hold the electrode. A cylindrical extension 26 extending axially from the second end of electrode holder 16 fits in a corresponding hole in housing 14. A set screw 28 releasably holds extension 26 in place.

A movable electrode 30 is fastened to the end of the conventional piston (not seen) within cylinder 12. In use, the operator holds cylinder 12 with one hand adjacent to switch lever 32 which, when pressed, operates a valve and electrical switch (not seen, but extending upwardly from the wall of cylinder 12 under lever 32) to turn on air to the cylinder through connection 17 and to turn on the conventional welding power supply through wire 34. This causes electrode 30 to move towards electrode 18, squeezing any metal parts between the electrodes, then welding them by resistance welding due to electrical current passing through the parts between the electrodes. Welding current is introduced through welding cable attachments 36 and 38. Attachment 36 is directly connected to the outer wall of pneumatic cylinder 12 so that the electric circuit runs from attachment 36 through the outside wall of cylinder 12, housing 14, electrode holder 16, electrode 18, any clamped parts being welded, electrode 30, the piston (not seen) and finally to attachment 38. Attachment 38 is secured to the piston through a slot 40 in the underside of cylinder 12 to permit attachment 38 to move with the piston. A sleeve 42 of insulating material, such as Teflon fluorocarbon resin, is placed between attachment 38 and the walls of slot 40 to maintain electrical isolation and allow smooth, low friction movement of attachment 38 in slot 40 when the piston is operated.

Upon completion of welding, lever 32 is released to turn off the welding current and release the pneumatic pressure. To assure that the weld is allowed to cool slightly before pressure is released, to assure that the weld has solidified under pressure, the orifice in the conventional pneumatic exhaust valve (not seen) is sized so as to delay retraction of the piston slightly after the welding current is turned off. Air pressure adjustments can be made by adjusting needle valve screw 44 in a conventional manner. In addition to the cylinder piston air supply, some air is preferably diverted through channels in the outer wall of cylinder 12 and exhausted to the atmosphere to cool the portion of cylinder 12 held in the operator's hand. A needle valve adjusting screw 46 is used to adjust the cooling air flow.

A reduced diameter (not seen) first end of cylinder 12 extends through a corresponding hole in housing 14 with a shoulder 48 bearing against housing 14. This reduced diameter end extends slightly beyond housing 14 and bears external threads onto which a retaining ring 50 is threaded to hold housing 14 in place. A T-handled bolt 52 extends into the lower end of housing 14 past slot 54 so that the position of housing relative to cylinder 12 can be locked at a selected position by tightening the T-bolt. Thus, the position of housing 14 and electrode holder 16 can be selected by loosening ring 50 and bolt 52, rotating housing 14 to the desired position and tightening ring 50 and bolt 52. Thus, obstructions can be avoided while allowing the operator to hold cylinder and switch 32 in the normal upright position.

Figure 5:
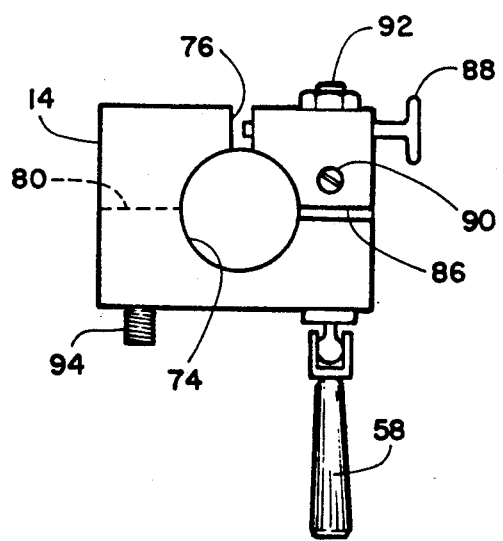
FIG. 5 is a detail view of a housing upper surface, taken on line 5—5 in FIG. 4.

In the embodiment shown in FIG. 1, a handle 56 is fitted to the upper, or second, end of housing 14. The upper end of housing 14 is adapted to connect to handle 14 or alternative electrode holders as detailed below. The configuration of the second end of housing 14 is detailed in FIG. 5, as discussed below. Handle 56 has an axially extending cylindrical end (not seen) extending into a corresponding hole (as seen in FIG. 5) and releasably locked therein by a cam lever 58, as detailed below.

Handle 56 and the outer surface 60 of cylinder 12 are preferably covered by a sleeve or coating of an electrically insulating material for the protection of the operator. A sleeve (not seen) of electrically insulating material, preferably a sturdy, low friction ceramic material surrounds the end of the piston in cylinder 12 where the piston extends through housing 14.

A second embodiment of the spot welding gun of this invention is shown in FIGS. 2 and 3, showing the installation of an arc-shaped electrode holder 64 in FIG. 2 and the fully assembled spot welding gun in FIG. 3. Electrode holder 64 replaces the electrode holder 16 and handle 56 seen in FIG. 1. Otherwise, the gun assembly and components are basically the same as in FIG. 1.

As seen in FIGS. 2 and 3, elongated electrode holder 64 has a first end 66 adapted to engage the upper or second end of housing 14 and a second end 68 adapted to hold electrode 18. First end 66 includes an axial cylindrical extension 70 having an outwardly extending transverse pin 72. The arc-like portion of electrode housing 64 is preferably covered with an electrically insulating material. The operator may use the upper portion of electrode holder 64 as a handle in positioning the gun for welding.

Figure 6:
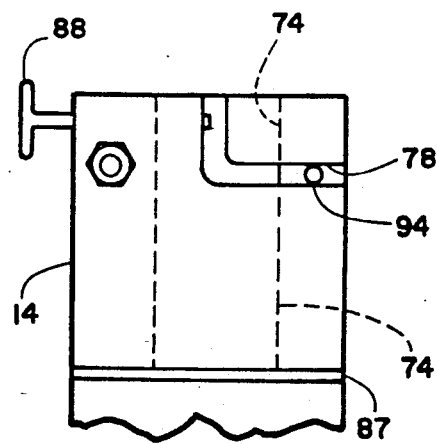
FIG. 6 is a detail view of the side of the housing upper end, taken on line 6—6 in FIG. 5.

As seen in FIGS. 2, 5 and 6, the upper or second end of housing 14 has a cylindrical hole 74 lying substantially perpendicular to the axis of cylinder 12 and corresponding in shape to extension 70. Axial slot 76 extends a selected distance along hole 74, between the hole and the exterior of the housing. Axial slot 76 ends at a transverse slot 78 extending approximately 90° around two sides of housing 14, ending at a location indicated by hidden line 80 in FIG. 5. Electrode holder 64 is installed by extending holder 64 in a plane substantially perpendicular to the axis of cylinder 12 as seen in FIG. 2 with pin 72 aligned with slot 76 and lowering extension 70 into hole 74 as indicated by arrow 82, then rotating holder 64 as indicated by arrow 82 in FIG. 3 until pin 72 abuts the end of slot 78 at line 80 (FIG. 5). Electrode holder 64 can then be locked in place by cam lever 58 which extends through housing 14 across slot 86 and squeezes slot 86 together and squeezes hole 74 against extension 70. In order to improve the flexibility of the walls adjacent to slot 86, housing 14 may have a transverse slot 87 cut through to slot 86 at about the bottom of hole 74.

Often it is necessary to weld metals panels together where the surrounding structure is considerably thicker than the panels, such as when welding automobile back panels, pick-up truck tailgates, etc. While prior art spot welding guns often must be entirely disassembled and reassembled to accomplish such welds, with the embodiment of FIGS. 2 and 3, cam lock 58 is simply released, electrode holder 64 is swung to the side, leaving a large gap between electrode 18 and the side of cylinder 12 and housing 14. The holder 64 is then lowered over the intervening structure and the holder is easily returned to the position shown in FIG. 3 with electrodes 18 and 30 correctly positioned for welding.

In order to prevent electrode holder 64 and housing 14 from inadvertently coming apart during such an operation, a bolt 88 is preferably threaded into the side of housing 14 so that once the electrode holder 64 is installed, bolt 88 can be threaded inwardly to close off slot 76, preventing accidental movement of pin 72 outwardly through slot 76. When electrode holder 64 is to be removed, bolt 88 is simply screwed back out of slot 76.

A set screw 90 is preferably threaded into a hole that communicates with the hole through which bolt 92 connected to lever locking means 58 extends. Set screw 90 when tightened against bolt 92 holds the locking means in the desired position, generally so that the handle of the locking assembly swings in a vertical plane.

It is important that the tips of electrodes 18 and 30 be precisely aligned during welding. Horizontal alignment can be adjusted by a set screw 94 which extends through housing 14 into the end 80 of slot 78. By moving set screw 94 in or out of slot 78, the position where pin 72 is stopped, and the horizontal position of the tip of electrode 18, can be easily set or adjusted. Extension 70 extends into a hole (not seen) in the end of electrode holder 64 and is held in place by two set screws 96. The vertical position of electrode 18 relative to electrode 30 ca be easily adjusted by loosening set screws 96 with electrode holder 64 secured in the position shown in FIG. 3, moving holder 64 up or down until the tip of electrode 18 is in the proper position, then tightening setscrews 96.

In the embodiments shown in FIGS. 1-3, unique housing installed on a conventional cylinder 12. in some cases, it may be desirable to install a housing and arc-shaped electrode holder of the sort shown in FIGS. 2 and 3 on an existing spot welder gun having a simple block-like housing mounted on a pneumatic cylinder. FIG. 4 illustrates an adapter permitting such an improved spot welding gun to be assembled.

As seen in FIG. 4, most of the components are the same as those described in conjunction with FIGS. 1-3. However, here a the housing assembly includes a simple housing 100 that is mounted to cylinder 12 by means of a cylindrical portion of the cylinder extending through a corresponding opening in housing 100 and held in place by a threaded ring 102 threaded onto the cylinder extension. This housing 100 has a transverse hole generally similar to hole 26 as seen in FIG. 1. The housing assembly further includes an adapter 104 which has a transverse cylindrical extension (not seen) secured in a the hole in housing 100. The cylindrical extension extending between holes in both housing 100 and adapter 104 may be secured by any suitable means such as set-screws engaging the cylindrical extension or bolts 101 extending across slots similar to bolt 52 in FIG. 1. Basically, adapter 104 is the same as the upper portion of housing 14 as seen in FIG. 1, from just below hole 26. However, the top portion of adapter 104 is rotated 90° from the top portion shown in FIG. 1.

The top portion that engages the arc-shaped electrode holder 64 can be arranged in any position desired about a vertical axis taken through housing 14 or adapter 104, so that cam lock 58 will extend along cylinder 12 or to either side. The position of pin 72 will be selected in accordance with the orientation of the top of adapter 104.

Other applications, variations and ramifications of this invention will occur to those skilled in the art upon reading this disclosure. Those are intended to be included within the scope of this invention, as defined in the appended claims.

I claim:

1. A multipurpose, adaptable, spot welding gun which comprises:
    a pneumatic cylinder adapted to be held in an operator's hand;
    means for securing a first welding electrode to the cylinder piston for movement toward and away from a first end of the cylinder;
    a rotatable housing assembly having a first end rotatable mounted on said cylinder for rotation around the cylinder axis adjacent to said first cylinder end and a second end extending away from said cylinder;
    first mounting means on said housing assembly intermediate the ends of said housing assembly, for supporting an elongated straight electrode holder substantially parallel to the cylinder axis of said rotatable housing, so that a second electrode in said straight electrode holder is in operative alignment with said first electrode;
    second mounting means at the second end of said housing assembly adapted to selectively support a handle extending away from the housing assembly end or to support a first end of an elongated arc-shaped electrode holder, so that an electrode mounted at the second end of said arc-shaped electrode holder is in operative alignment with said first electrode;
    welding cable attachment means on said cylinder in electrical connection with said first and second electrodes;
    switch means on the cylinder for admitting air into said pneumatic cylinder for moving the first electrode toward and away from the second electrode and for turning a power supply connected to said attachment means on and off.

2. The spot welding gun according to claim 1 wherein said first mounting means comprises a hole in said housing substantially parallel to said cylinder and intermediate the ends of the housing adapted to receive a cylindrical extension on said straight electrode holder and releasable locking means for securing extension cylinder in place in said hole.

3. The spot welding gun according to claim 1 wherein said second mounting means comprises:
    an axial hole in the end of said housing;
    a first axial slot between said hole wall and the outer wall of said housing;
    a second radial slot communicating with said first axial slot and extending a selected distance around said housing end;
    an arc-shaped electrode holder having means on a first end for holding an electrode;
    a cylindrical extension on the second end of said arc-shaped electrode holder adapted to enter said hole;
    a transverse extending pin on said cylindrical extension adapted to enter said first slot when said cylindrical extension enters said hole and move into said second slot when said arc-shaped electrode holder is rotated;
    the end of said second radial slot located to position said arc-shaped electrode holder in an operative position relative to said first electrode.

4. The spot welding gun according to claim 1 wherein said rotatable housing assembly comprises:
    a first housing member mounted for rotation about the cylinder axis;
    an elongated adapter means;
    means for mounting said adapter means on said first housing member with an outer end of said adapter means extending away from said cylinder;
    an axial hole in the outer end of said adapter means;
    a first, axial, slot between said hole wall and the outer wall of said adapter means; and
    a second, radial, slot communicating with said first slot and extending a selected distance around said housing end;
    an arc-shaped electrode holder having means on a first end for holding an electrode;
    a cylindrical extension on the second end of said arc-shaped electrode holder adapted to enter said hole;
    a transverse extending pin on said cylindrical extension adapted to enter said first slot when said cylindrical extension enters said hole and move into said second slot when said arc-shaped electrode holder is rotated;
    the end of said second radial slot located to position said arc-shaped electrode holder in an operative position relative to said first electrode.

5. The spot welding gun according to claim 4 further including locking means adapted to lock said cylindrical extension in said axial hole.

6. An electrode holding system for use in a spot welding gun of the type having a pneumatic cylinder for moving a first electrode into cooperative engagement with a fixed second electrode which comprises:

a housing assembly adapted to be mounted at a first end of the welding gun cylinder for rotation about the cylinder axis and having a second end extending away from said axis;

first mounting means on said housing assembly intermediate the ends of said housing assembly, adapted to support an elongated straight electrode holder substantially parallel to the cylinder axis, so that a second electrode in said straight electrode holder is in operative alignment with said first electrode; and second mounting means at the second end of said housing assembly adapted to selectively support a handle extending away from the housing assembly end or to support a first end of an elongated arc-shaped electrode holder, so that an electrode mounted at the second end of said arc-shaped electrode holder is in operative alignment with said first electrode.

7. The electrode holding system according to claim 6 wherein said first mounting means comprises hole in said housing substantially parallel to said cylinder and intermediate the ends of the housing adapted to receive a cylindrical extension on said straight electrode holder and releasable locking means for securing that cylindrical extension inserted in said hole.

8. The electrode holding system according to claim 6 wherein said second mounting means includes an axial hole in the end of said housing, a first axial slot between said hole wall and the outer wall of said housing and a transverse slot communicating with said first and extending part way around said housing end, so that a cylindrical extension on said arc-shaped electrode holder may enter said hole and a transverse extending pin on said cylindrical extension may enter said first slot and, upon said pin reaching said second slot, the arc-shaped electrode holder may be rotated to cause said pin to move along said transverse slot to the end of the transverse slot whereby said arc-shaped electrode holder is in the operating position.

9. The electrode holding system according to claim 8 further including setscrew means extending into said transverse slot for adjusting the distance said transverse pin can move at the fully rotated position of the arc-shaped electrode holder.

10. The electrode holding system according to claim 8 further including means for releasably locking said cylindrical extension in said hole.

11. The electrode holding system according to claim 10 wherein said locking means comprises a second axial slot between said hole and the outer wall of said housing, a transverse hole through said housing and second slot, perpendicular to said axial slot, a bolt through said transverse hole and a cam lever means on said bolt adapted to squeeze said slot walls together, causing said hole to squeeze against said cylindrical extension.

12. The electrode holding system according to claim 8, further including a bolt in a hole that intersects said first axial slot adjacent to the end of said housing, said bolt selectively threadable into said hole to block removal of said pin through said slot, whereby inadvertent separation of said arc-shaped electrode holder from said housing is prevented.

13. The electrode holding system according to claim 6 wherein said rotatable housing assembly comprises:

a first housing member mounted for rotation about the cylinder axis;

an elongated adapter means mounted on said first housing member and having an outer end extending away from said cylinder;

an axial hole in the outer end of said adapter;

a first axial slot between said hole wall and the outer wall of said adapter; and a second radial slot communicating with said first and extending part way around said housing end;

whereby a cylindrical extension on said arc-shaped electrode holder may enter said hole and a transverse extending pin on said cylindrical extension may enter said first slot and, upon said pin reaching said second slot, the arc-shaped electrode holder may be rotated to cause said pin to travel in said second slot to said operative position of said arc-shaped electrode holder.

14. The electrode holding system according to claim 13 further including setscrew means extending into said transverse slot for adjusting the fully rotated position of the arc-shaped electrode holder.

15. The electrode holding system according to claim 13 further including means for releasably locking said cylindrical extension in said hole.

16. The electrode holding system according to claim 15 wherein said locking means comprises a second axial slot between said hole and the outer wall of said housing, a transverse hole through said housing and second slot, perpendicular to said slot, a bolt through said transverse hole and a cam lever means on said bolt adapted to squeeze said slot walls together, causing said hole to squeeze against said cylindrical extension.

17. The electrode holding system according to claim 13, further including a bolt in a hole that intersects said first axial slot adjacent to the end of said housing, said bolt selectively threadable into said hole to block removal of said pin through said slot, whereby inadvertent separation of said arc-shaped electrode holder from said housing is prevented.

18. An electrode holding system for use in a spot welding gun of the type having a pneumatic cylinder for moving a first electrode into cooperative engagement with a fixed second electrode which comprises:

a housing assembly adapted to be mounted at a first end on the welding gun cylinder for rotation about the cylinder axis and having a second end extending away from said axis;

an axial hole in the second end of said housing;

a first axial slot between said hole wall and the outer wall of said housing;

a transverse slot communicating with said first and extending part way around said housing end;

an arc-shaped electrode holder having a first end and adapted to mount a second electrode at the second holder end;

a cylindrical extension at the second end of the an arc-shaped electrode holder sized to fit in said axial hole;

a transverse extending pin on said cylindrical extension sized to fit in said axial slot and said transverse slot;

whereby said cylindrical extension and said transverse pin may be inserted in said hole and slot, respectively, and rotated to bring said second electrode into the operating position relative to said first electrode.

19. The electrode holding system according to claim 18 further including setscrew means extending into said transverse slot for adjusting the fully rotated position of the arc-shaped electrode holder.

20. The electrode holding system according to claim 18 further including means for releasably locking said cylindrical extension in said hole.

21. The electrode holding system according to claim 20 wherein said locking means comprises a second axial slot between said hole and the outer wall of said housing, a transverse hole through said housing and second slot, perpendicular to said slot, a bolt through said transverse hole and a cam lever means on said bolt adapted to squeeze said slot walls together, causing said hole to squeeze against said cylindrical extension.

22. The electrode holding system according to claim 18, further including a bolt in a hole that intersects said first axial slot adjacent to the end of said housing, said bolt selectively threadable into said hole to block removal of said pin through said slot, whereby inadvertent separation of said arc-shaped electrode holder from said housing is prevented.

23. An electrode holding system for use in a spot welding gun of the type having a pneumatic cylinder for moving a first electrode into cooperative engagement with a fixed second electrode which comprises:
   a housing adapted to be mounted at a first end on the welding gun cylinder for rotation about the cylinder axis and having a second end extending away from said axis;
   an elongated adapter having mounting means for removably securing said adapter to said housing said first housing member;
   said adapter having an outer end extending away from said cylinder;
   an axial hole in the outer end of said adapter;
   a first axial slot between said hole wall and the outer wall of said adapter; and
   a second, transverse, slot communicating with said first and extending part way around said housing end;
   an arc-shaped electrode holder having a first end and adapted to mount a second electrode at the second holder end;
   a cylindrical extension at the second end of the an arc-shaped electrode holder sized to fit in said axial hole;
   a transverse extending pin on said cylindrical extension sized to fit in said axial slot and said transverse slot;
   whereby said cylindrical extension and said transverse pin may be inserted in said hole and slot, respectively, and rotated to bring said second electrode into the operating position relative to said first electrode.

24. The electrode holding system according to claim 23 wherein said means for mounting said adapter on said housing comprises a mounting hole in said housing extending generally parallel to the cylinder axis, a cylindrical mounting extension on the side of said adapter sized to fit within said mounting hole, and means for locking said mounting extension in said mounting hole.

25. The electrode holding system according to claim 24 further including setscrew means extending into said transverse slot for adjusting the fully rotated position of the arc-shaped electrode holder.

26. The electrode holding system according to claim 24 further including means for releasably locking said cylindrical extension in said hole.

27. The electrode holding system according to claim 26 wherein said locking means comprises a second axial slot between said hole and the outer wall of said housing, a transverse hole through said housing and second slot, perpendicular to said slot, a bolt through said transverse hole and a cam lever means on said bolt adapted to squeeze said slot walls together, causing said hole to squeeze against said cylindrical extension.

28. The electrode holding system according to claim 24, further including a bolt in a hole that intersects said first axial slot adjacent to the end of said housing, said bolt selectively threadable into said hole to block removal of said pin through said slot, whereby inadvertent separation of said arc-shaped electrode holder from said housing is prevented.

* * * * *